United States Patent
Nachbagauer et al.

(10) Patent No.: US 12,527,337 B2
(45) Date of Patent: Jan. 20, 2026

(54) FACILITY FOR PRODUCING AN AQUEOUS FOOD PRODUCT AND ITS USE AND METHOD FOR PRODUCING AQUEOUS FOOD PRODUCTS

(71) Applicant: Red Bull GmbH, Fuschl am See (AT)

(72) Inventors: Josef Nachbagauer, Fuschl am See (AT); Christian Rinderer, Fuschl am See (AT); Lukas Witwer, Fuschl am See (AT)

(73) Assignee: Red Bull GmbH, Fuschl am See (AT)

( * ) Notice: Subject to any disclaimer, the term of this patent is extended or adjusted under 35 U.S.C. 154(b) by 28 days.

(21) Appl. No.: 18/259,248

(22) PCT Filed: Dec. 23, 2021

(86) PCT No.: PCT/EP2021/087582
§ 371 (c)(1),
(2) Date: Jun. 23, 2023

(87) PCT Pub. No.: WO2022/136678
PCT Pub. Date: Jun. 30, 2022

(65) Prior Publication Data
US 2024/0049753 A1    Feb. 15, 2024

(30) Foreign Application Priority Data

Dec. 23, 2020 (EP) ..................................... 20216997

(51) Int. Cl.
| | | |
|---|---|---|
| *A23L 2/385* | (2006.01) | |
| *A23L 2/60* | (2006.01) | |
| *A23P 30/00* | (2016.01) | |
| *G01N 21/359* | (2014.01) | |
| *G01N 21/85* | (2006.01) | |
| *G01N 33/14* | (2006.01) | |

(52) U.S. Cl.
CPC ................. *A23L 2/385* (2013.01); *A23L 2/60* (2013.01); *G01N 21/359* (2013.01); *G01N 21/85* (2013.01); *G01N 33/143* (2013.01); *A23P 30/00* (2016.08)

(58) Field of Classification Search
CPC . G01N 21/359; A23L 2/60; A23L 2/38; A23L 2/385
See application file for complete search history.

(56) References Cited

U.S. PATENT DOCUMENTS

| 2001/0045242 A1* | 11/2001 | Clusserath | B67C 3/007 |
| | | | 141/144 |
| 2009/0201493 A1* | 8/2009 | Tosch | G01N 21/474 |
| | | | 356/51 |
| 2011/0195161 A1 | 8/2011 | Upreti et al. | |

FOREIGN PATENT DOCUMENTS

| CN | 207074168 U | * | 3/2018 | | |
| DE | 202007006508 U1 | * | 9/2007 | | G01N 21/31 |
| DE | 10 2016 109 472 A1 | | 11/2017 | | |
| EP | 2284517 A1 | * | 2/2011 | | G01N 21/15 |

OTHER PUBLICATIONS

International Search Report for International Application No. PCT/EP2021/087582, mailing date Apr. 18, 2022, 2 pages.
Examination Report dated Feb. 5, 2025, for Australian Patent Application No. 2021405061. (5 pages).
Mehrotra et al., "NIR spectroscopy and fiber optic probe for determination of alcohol, sugar and tartaric acid in alcoholic beverages," Journal of Scientific & Industrial Research 64:134-137, Feb. 2005. (4 pages).
Thermo Fisher Scientific Inc., "FT-NIR Analysis of Wine," 2007, URL=http://www.tecnofrom.com/moduloNotas/noti_2/archivosAdjuntos/Analisis_de_Vinos_-_NIR_882.pdf>, retrieved on Feb. 5, 2025. (4 pages).

\* cited by examiner

*Primary Examiner* — Thien S Tran
(74) *Attorney, Agent, or Firm* — Seed Intellectual Property Law Group LLP (57) ABSTRACT

A facility for producing an aqueous food product and a component of such a facility includes a mixing device with a mixing container and a feed line for fluid media containing at least one ingredient for aqueous food products to the mixing container and a discharge line for a fluid medium, containing the aqueous food product mixed in the mixing device, from the mixing container, and at least one infrared spectrometer, in some cases an FT-NIR spectrometer, arranged and adapted for the inline detection of ingredients of aqueous food products. The present disclosure further relates to a method for producing aqueous food products comprising the inline detection of at least one ingredient in a fluid medium with an infrared spectrometer, in some cases an FT-NIR spectrometer. In addition, the present disclosure relates to the use of an infrared spectrometer, in some cases an FT-NIT spectrometer, for detecting at least one ingredient for aqueous food products or for the inline monitoring of at least one ingredient for aqueous food products in a facility for producing a plurality of containers filled with an aqueous food product.

19 Claims, 2 Drawing Sheets

FACILITY FOR PRODUCING AN AQUEOUS FOOD PRODUCT AND ITS USE AND METHOD FOR PRODUCING AQUEOUS FOOD PRODUCTS

BACKGROUND

Technical Field

The present disclosure relates to a facility for producing an aqueous food product, in some cases a beverage, such as an energy drink or soft drink, as well as to a component of such a facility. The present disclosure further relates to a method for the, in some cases continuous, production of aqueous food products, such as beverages. Lastly, the present disclosure relates to the use of an infrared spectrometer for detecting one or more ingredients of aqueous food products in a facility for producing a plurality of containers filled with an aqueous food product or for the inline monitoring of one or more ingredients of aqueous food products in a facility for producing a plurality of containers filled with an aqueous food product.

Description of the Related Art

Beverages, such as soft drinks and energy drinks, have been filled and made ready for delivery in high-speed production facilities for a long time already. For example, currently easily several thousand containers can be filled per hour. In beverage production, which comprises, e.g., bringing together and mixing individual components, processing the output or intermediate products, filling final products into suitable containers such as bottles or cans and performing a pasteurization step, many different high quality and hygiene standards need to be met continuously. These requirements place high demands both on the staff, their training and further education and also on the inspection and maintenance of the equipment used. If it is discovered in retrospect that a batch does not comply with the specifications, large amounts of product sometimes need to be disposed of at great expense. In order to be able to check and document compliance with quality standards, random samples are tested off-line in a laboratory on a regular basis. Although this procedure provides very accurate analysis results, it is time-consuming and provides results with a significant time lag from the time the sample is taken. If products do not comply with the specifications, a large number of filled containers have to be disposed of.

Thus, there is accordingly a need to provide a facility for producing an aqueous food product, in some cases a facility for producing a plurality of containers filled with an aqueous food product, which is no longer associated with the aforementioned disadvantages and which in some cases ensures a rapid and reliable quality check during the production of beverages and/or, in some cases continuous monitoring of parameters that are essential to the production of beverages.

BRIEF SUMMARY

Accordingly, a facility has been found for producing an aqueous food product, in some cases a beverage such as an energy or soft drink, and also a component of the facility for producing an aqueous food product, comprising in each case at least one infrared spectrometer, such as a Fourier-Transformation (FT)-NIR spectrometer, arranged and adapted for the inline detection of ingredients of aqueous food products in fluid systems.

DETAILED DESCRIPTION

Figure 1:
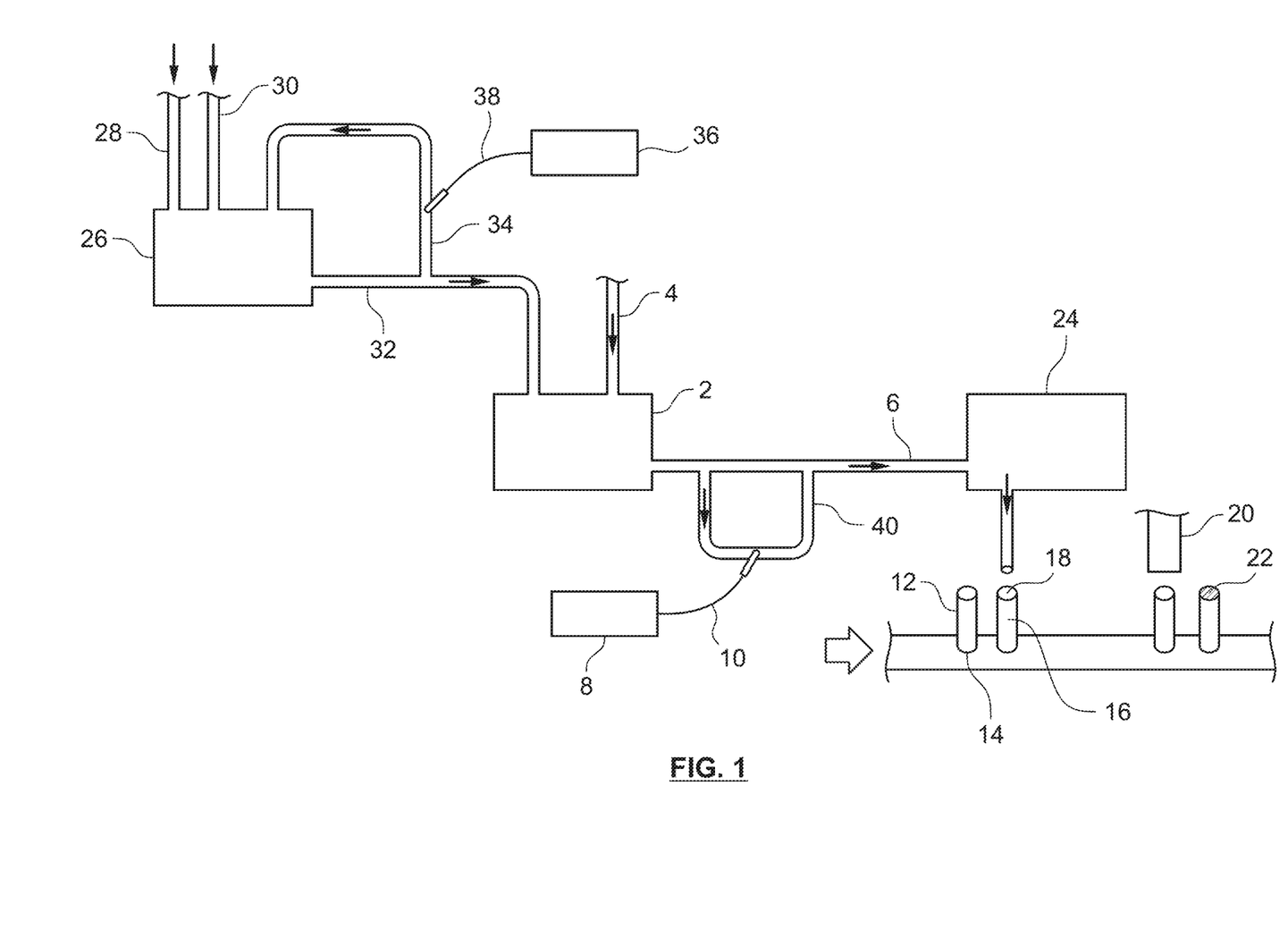
FIG. 1 is a schematic diagram illustrating an implementation of a facility for producing an aqueous food product as described in the present disclosure.
Figure 2:
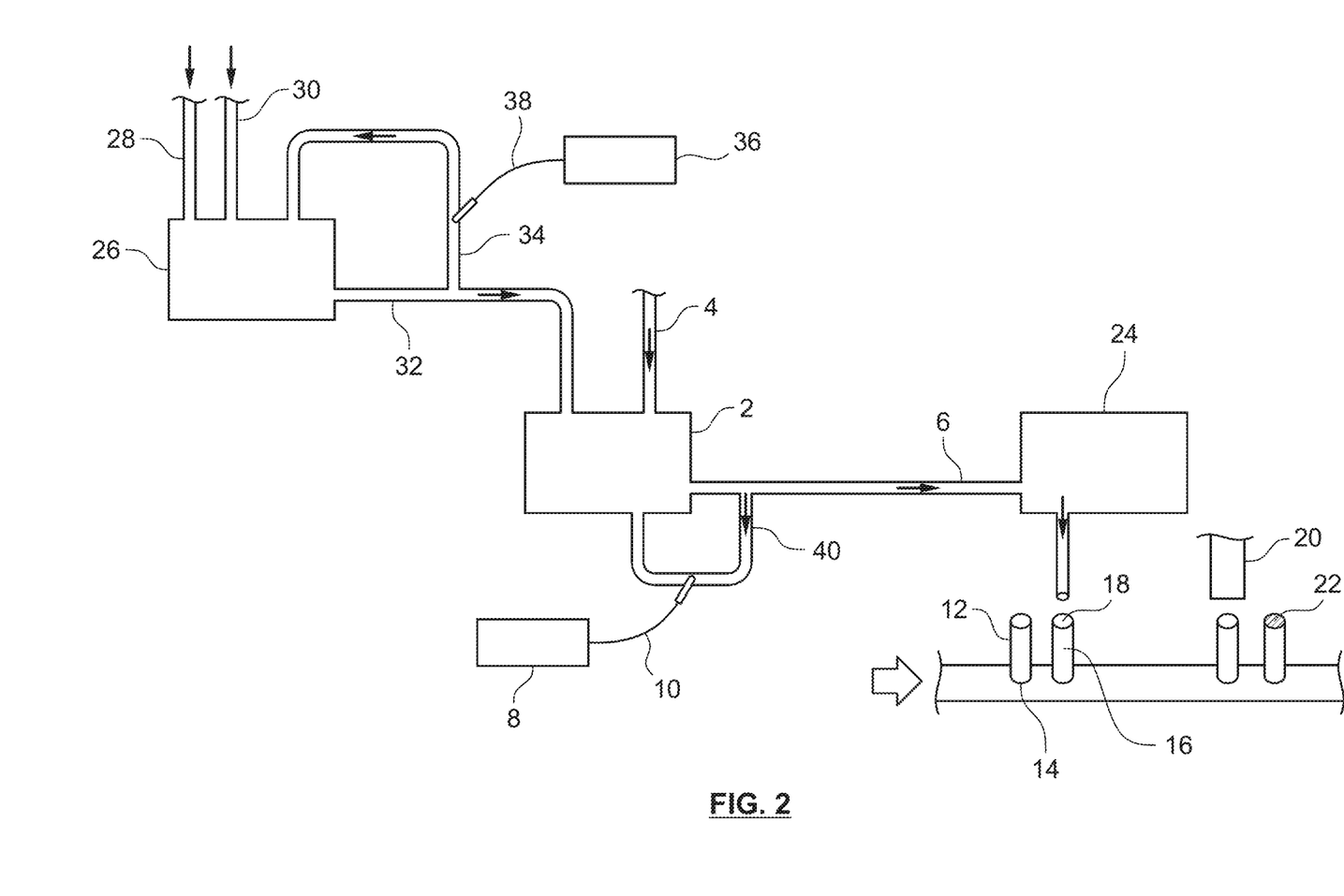
FIG. 2 is a schematic diagram illustrating another implementation of a facility for producing an aqueous food product as described in the present disclosure.

As illustrated in FIGS. 1 and 2, in various implementations, the present disclosure further provides a facility for producing an aqueous food product, in some cases a beverage such as an energy or soft drink, and a component of such a facility, comprising:
   a) at least one mixing device 2 with a mixing container, and
   b) at least one feed line 4 to the mixing container for fluid media, in some cases liquid media, consisting of or containing at least one ingredient or a plurality of ingredients, for aqueous food products,
   c) a discharge line 6 from the mixing container for a liquid medium, containing the aqueous food product mixed in the mixing device, and
   d) at least one infrared spectrometer, such as an FT-NIR spectrometer, arranged and adapted for the inline detection of ingredients of aqueous food products in the at least one feed line for fluid, in some cases, media, and/or
   e) at least one infrared spectrometer, in such as an FT-NIR spectrometer, arranged and adapted for the inline detection of ingredients of aqueous food products in the at least one discharge line.

Furthermore, in a suitable embodiment according to the present disclosure a facility is provided for producing an aqueous food product, in some cases beverage such as an energy or soft drink, or a component thereof, comprising:
   a) at least one mixing device 2 with a mixing container and
   b) at least one feed line 4 to the mixing container for fluid media, in some cases liquid media, consisting of or containing at least one ingredient or a plurality of ingredients, for aqueous food products,
   c) a discharge line 6 from the mixing container for a liquid medium, containing the aqueous food product mixed in the mixing device, and
   d) a bypass line 40, which runs from the discharge line, in some cases adjacent to the mixing device, wherein the bypass line in some cases runs, in some other cases downstream, in some even other cases adjacent to a filling device, into the discharge line, and
   e) at least one infrared spectrometer, such as an FT-NIR spectrometer, arranged and adapted for the inline detection of ingredients of aqueous food products in the at least one feed line for fluid media, and/or
   f) at least one infrared spectrometer, such as an FT-NIR spectrometer, arranged and adapted for the inline detection of ingredients of aqueous food products in the at least one discharge line, and/or
   g) at least one infrared spectrometer 8, such as FT-NIR spectrometer, arranged and adapted for the inline detection of ingredients of aqueous food products in the bypass line.

In an expedient embodiment, by which the present disclosure can be achieved very satisfactorily, an infrared spectrometer 8, in some cases the FT-NIR spectrometer, can be used, which is arranged and adapted for the inline detection of ingredients of aqueous food products in the bypass line 40. In an expedient embodiment there is no additional infrared spectrometer, such as a FT-NIR spectrometer, arranged and adapted for the inline detection of ingredients of aqueous food products, in the feed line and/or in the discharge line, in some cases in the feed line.

Accordingly, the facility for producing a beverage, such as an energy or soft drink, or component thereof, in an expedient embodiment comprises:

a) a mixing device 2 with a mixing container and b) at least one feed line 4 to the mixing container for fluid liquid media, consisting of or containing at least one ingredient or a plurality of an ingredients, for aqueous food products, c) a discharge line 6 from the mixing container for a liquid medium, containing the aqueous food product mixed in the mixing device, and d) a bypass line 40, which runs from the discharge line, in some cases adjacent to the mixing device, wherein the bypass line in some cases runs, in some other cases downstream, in some even other cases adjacent to a filling device, into the discharge line, and g) an FT-NIR spectrometer 8, arranged and adapted for the inline detection of ingredients of aqueous food products in the bypass line.

The facility according to the present disclosure generally comprises as components the blending device 26 or the blending area for producing ingredient concentrates, the mixing device and the filling device. Further components comprise the closure device 20 and in some cases a pasteurizing unit. Furthermore, it can be provided that the facility according to the present disclosure, in some cases a high-speed facility, has a plurality of discharge lines downstream of the mixing device or that a plurality of discharge lines run from one discharge line, so that the mixture obtained in the mixing device, in some cases beverage mixture, can be supplied to two or more filling devices 24.

With the instrumental integration of an infrared spectrometer, such as an FT-NIR spectrometer, according to the present disclosure, into a facility for producing an aqueous food product, such as a beverage, in some cases into a facility for producing a plurality of containers filled with an aqueous food product, the qualitative and also the quantitative inline monitoring of one or in some cases several ingredients of aqueous food products is achieved and surprisingly even over a very broad concentration range. Accordingly, both the main and also secondary components of a liquid food product can be detected and monitored, in some cases also simultaneously. In an expedient embodiment a component of a facility for producing an aqueous food product, in some cases beverage, such as an energy or soft drink, is provided, consisting of or comprising:

a) a mixing device with a mixing container, and b) a feed line for fluid liquid media, containing at least one ingredient or a plurality of ingredients of aqueous food products to the mixing container, c) a discharge line from the mixing container for a liquid medium, containing the aqueous food product mixed in the mixing device, and d) a bypass line, which runs from the discharge line, in some cases adjacent to the mixing device, and which in some cases runs into the discharge line downstream, in some other cases adjacent to a filling device, and g) an infrared spectrometer, arranged and adapted for the inline detection of ingredients of aqueous food products in the bypass line, and in some cases e) an infrared spectrometer, arranged and adapted for the inline detection of ingredients of aqueous food products in the at least one feed line for fluid media.

The infrared spectrometers used in the facility according to the present disclosure or the component according to the present disclosure, in some cases all infrared spectrometers used in the facility according to the present disclosure, are in some expedient cases Fourier-Transformation (FT)-NIR spectrometers. The at least one infrared spectrometer, in some cases FT-NIR spectrometer, hereby comprises in some cases at least one light guide and a measuring cell, such as a transmission process probe 10, 38, arranged and adapted to come into contact with the at least one fluid, in some cases liquid, medium, consisting of or containing the at least one ingredient, or with the aqueous food product. In a practical embodiment, the at least one light guide passes into the measuring cell, in some cases the transmission process probe, or links to the latter. This measuring cell or transmission process probe 10, 38, e.g., in a rod-like embodiment, can project as a component of the infrared spectrometer into the container filled with the aqueous food product and in some cases also into the feed, discharge, bypass or transfer lines 34, 40, in order to perform the required interaction of ingredients with infrared radiation for the qualitative and/or quantitative analysis.

The at least one infrared spectrometer, in some cases the FT-NIR spectrometer, in some other cases the plurality of infrared spectrometers, in some even other cases FT-NIR spectrometers, comprises in some cases a data processing device, arranged and adapted, to store and evaluate the data determined by infrared spectroscopy of the respective ingredients, in some cases beverage ingredients, of the fluids, in some cases liquids, media or aqueous food product, in some cases compare it with reference data stored in the data processing device for the respective ingredient(s). Here, the evaluation can be both qualitative and also quantitative. The at least one infrared spectrometer, in some cases the FT-NIR spectrometer, is in some cases adapted and arranged to simultaneously determine the content of two or more ingredients, in some cases beverage ingredients. By using the data processing device it is also possible to quantitatively detect the at least one ingredient in the liquid medium or in the aqueous food product.

The facility according to the present disclosure or the facility component according to the present disclosure can be equipped with one or a plurality of data processing devices. If said facility or component of the facility comprises a plurality of data processing devices, the latter are in some cases a component of the respective infrared spectrometers, in some cases the FT-NIR spectrometers, or are connected to the latter. If the facility or the facility component comprises only one data processing device however, this is connected to the at least one infrared spectrometer, in some cases an FT-NIR spectrometer, in some other cases to a plurality of FT-NIR spectrometers, and is arranged and adapted, to save the data on the respective ingredient(s), in some cases beverage ingredients, fluid, in some cases liquid, media or aqueous food products, determined by the at least one infrared spectrometer, in some cases an FT-NIR spectrometer, in some other cases by a plurality of FT-NIR spectrometers, and in some cases evaluate qualitatively and/or quantitatively, in some cases compare it with reference data stored in the data processing device for the respective ingredient(s).

A further advantage of the facility or the facility component according to the present disclosure is also that by incorporating the infrared spectrometer, in some cases an FT-NIR spectrometer, at least one ingredient of aqueous food products, in some cases multiple ingredients, can be detected quasi continuously, in some cases at recurring measurement intervals of in the range of 5 to 90 seconds and in some other cases in the range of 10 to 20 seconds. Due to the very short measuring intervals the production process can be monitored substantially seamlessly. By means of the facility according to the present disclosure data on the respective ingredients, in some cases beverage ingredients, of the fluid, in some cases liquid, media or aqueous food product determined by infrared spectroscopy at a measurement time point, supported by a data processing device can be assigned to a batch or succession of containers filled consecutively with the liquid food product and in some cases assigned to one individual container filled with the liquid food product and for example read into a code applied to the container or container. The data on the respective ingredients determined by infrared spectroscopy and assigned to a measurement time point can be assigned to a container base body filled in the filling device with the aqueous food product, in some cases the aqueous beverage mixture, or a plurality of container base bodies filled successively with the aqueous food product, in some cases the aqueous beverage mixture by using the data processing device. This means that even after a container has been sold, a product code applied to the container can be used to reliably determine the specific ingredients used and the quantities of these ingredients, thus providing retrospective confirmation that the product has been manufactured according to the specifications.

In one possible embodiment at least one infrared spectrometer (component h)) can be provided, which is arranged and adapted for the inline detection of ingredients of aqueous food products in the mixing device itself. This is expedient, if, e.g., a change of beverage needs to be carried out in the facility according to the present disclosure.

The facility according to the present disclosure, in some cases as a facility for producing beverages, further comprises, in an expedient embodiment, a filling device (component i)), which is connected or is connectable via the discharge line to the mixing device, adapted and arranged for filling the aqueous food product, in some cases the aqueous beverage mixture, obtained or obtainable with the mixing device, into a plurality of container base bodies, in some cases beverage container base bodies, in some further cases beverage can base bodies, each containing a container base, a container wall and a filling opening.

In a further practical embodiment, the facility according to the present disclosure is equipped with the bypass line (component d)), which runs from the discharge line adjacent to the mixing device and runs downstream into the discharge line adjacent to the filling device. Here in a practical embodiment in this bypass line at least one infrared spectrometer (component g)) can be provided, arranged and adapted for the inline detection of ingredients of aqueous food products.

The facility according to the present disclosure or component thereof according to the present disclosure is equipped in an expedient embodiment with a discharge line and a bypass line, which runs from the discharge line, in some cases adjacent to the mixing device, and which runs in some cases downstream into the discharge line, in some cases adjacent to the filling device. Furthermore, in this embodiment at least one measuring cell, as described above, is provided which is arranged and adapted to come into contact with the aqueous food product in the bypass line. In some cases, this measuring cell is positioned downstream of the outlet of the bypass line from the discharge line before and in some other cases between the outlet and the opening of the bypass line in the discharge line or in the bypass line, in some cases in the discharge line.

In a further expedient embodiment the facility according to the present disclosure is further equipped with at least one closure device (component j)), adapted and arranged for closing, in some cases tightly, the container base body filled by the filling device, in some cases the beverage container base body, in some further cases the filled beverage can base body, with a container closure, in some cases a beverage can lid.

A subject-matter of the present disclosure is thus also such a device, which is suitable as a component of a facility for producing an aqueous food product, in some cases a facility for producing a plurality of containers filled with an aqueous food product, consisting of or comprising at least one mixing device with a mixing container, at least one feed line for liquid media, containing at least one ingredient, in some cases a plurality of ingredients, for aqueous food products, to the mixing container, a discharge line for a liquid medium, containing the aqueous food products mixed in the mixing device, from the mixing container, and at least one infrared spectrometer, in some cases an FT-NIR spectrometer, arranged and adapted for the inline detection of ingredients of aqueous food products in the at least one feed line for liquid media, and/or at least one infrared spectrometer, in some cases an FT-NIR spectrometer, arranged and adapted for the inline detection of ingredients of aqueous food products in the at least one discharge line. Alternatively or additionally, this facility component can also have a bypass line running from the discharge line and back into the latter, which bypass line is in some cases equipped with an infrared spectrometer, in some cases an FT-NIR spectrometer.

The facility according to the present disclosure, in some cases as a facility for producing beverages, in an expedient embodiment is further characterized in that the mixing device is adapted and arranged for mixing ingredients, in some cases beverage ingredients, obtaining an, in some cases carbonated, aqueous food product, in some cases a beverage mixture, containing the mixing container, and a first feed line to this mixing container for an, in some cases carbonated, aqueous system, and a second feed line to this mixing container for at least a first ingredient, in some cases beverage ingredient, or a first ingredient mixture, in some cases beverage ingredient mixture, and in some cases a third feed line to this mixing container for at least one ingredient, in some cases second beverage ingredient, or a second ingredient mixture, in some cases beverage ingredient mixture, and in some cases a fourth feed line to this mixing container for at least one third ingredient, in some cases beverage ingredient, or a third ingredient mixture, in some cases beverage ingredient mixture, and in some cases at least one further feed line to this mixing container for at least one further ingredient, in some cases beverage ingredient, or at least one further ingredient mixture, in some cases beverage ingredient mixture.

The present disclosure further describes a mixing device for a facility for producing an aqueous food product, in some cases a beverage such as an energy or soft drink, comprising at least one mixing container; at least one feed line for liquid media, containing at least one ingredient, in some cases a plurality of ingredients, for aqueous food products, to the mixing container; a discharge line for a liquid medium, containing the aqueous food product mixed in the mixing container, from the mixing container; and at least one infrared spectrometer, arranged and adapted for the inline detection of ingredients of aqueous food products in the at least one feed line for liquid media and/or at least one infrared spectrometer, arranged and adapted for the inline detection of ingredients of aqueous food products in the at least one discharge line.

A highly suitable mixing device according to the present disclosure for a facility, in some cases a high-speed production facility, for producing an aqueous food product, in some cases a beverage such as an energy or soft drink, comprises a mixing container, a feed line to the mixing container for liquid media, containing an ingredient, in some cases a plurality of ingredients, for aqueous food products, a discharge line from the mixing container for a liquid medium, containing the aqueous food product mixed in the mixing container, and in some cases a bypass line, which runs from the discharge line, in some cases adjacent to the mixing device, and which in some cases runs downstream into the discharge line, in some cases adjacent to the filling device, and at least one infrared spectrometer, in some cases an FT-NIR spectrometer, arranged and adapted for the inline detection of ingredients of aqueous food products in the feed line for fluid, in some cases liquid, media, and/or an infrared spectrometer, arranged and adapted for the inline detection of ingredients of aqueous food products in the at least one discharge line and/or at least one infrared spectrometer, in some cases an FT-NIR spectrometer, arranged and adapted for the inline detection of ingredients of aqueous food products in the bypass line.

Furthermore, also such a mixing device according to the present disclosure is highly expedient for use in high-speed facilities, comprising a mixing container, a feed line for liquid media, containing at least one ingredient, in some cases a plurality of ingredients, for aqueous food products, to the mixing container, a discharge line for a liquid medium, containing the aqueous food product mixed in the mixing container, from the mixing container, and a bypass line which runs from the discharge line, in some cases adjacent to the mixing device, and which runs downstream into the discharge line, in some cases adjacent to the filling device, at least one FT-NIR spectrometer, arranged and adapted for the inline detection of ingredients of aqueous food products in the at least one feed line for fluid, in some cases liquid, media or at least one FT-NIR spectrometer, arranged and adapted for the inline detection of ingredients of aqueous food products in the bypass line.

The facility according to the present disclosure is in some cases a facility for high-speed production or a component thereof. A facility for the high-speed production of filled beverage containers, in some cases filled beverage cans, also known as a high-speed production facility, are generally facilities which can fill more than 80,000 containers per hour, in some cases more than 100,000 containers and in some even other cases in the region of 120,000 containers per hour, with a liquid food product, e.g., beverage.

In a further expedient embodiment, the facility according to the present disclosure further comprises at least one blending device 26, adapted and arranged for blending ingredients, in some cases beverage ingredients, obtaining an aqueous food product concentrate, in some cases a beverage mixture concentrate, containing a blending container and a feed line 28 to this blending container for an aqueous system, in some cases water, and a feed line 30 to this blending container for at least one first ingredient, in some cases beverage ingredient, or a first ingredient mixture, in some cases beverage ingredient mixture, and in some cases a feed line to this blending container for at least one second ingredient, in some cases second beverage ingredient, or a second ingredient mixture, in some cases beverage ingredient mixture, and in some cases a feed line to this blending container for at least a third ingredient, in some cases beverage ingredient, or a third ingredient mixture, in some cases beverage ingredient mixture, and in some cases a feed line to this blending container for at least one fourth ingredient, in some cases beverage ingredient, or a fourth ingredient mixture, in some cases beverage ingredient mixture, and at least one transfer line 32 for a liquid medium, containing or consisting of the aqueous food product concentrate blended in the blending device, in some cases beverage mixture concentrate, and in some cases at least one bypass line 34, which runs from the transfer line 32, in some cases adjacent to the blending device, and which in some cases runs into the blending device. This embodiment of a facility is further equipped with at least one infrared spectrometer, in some cases an FT-NIR spectrometer, arranged and adapted for the inline detection of ingredients of aqueous food products in the transfer line 32, and/or with at least one infrared spectrometer 36, in some cases an FT-NIR spectrometer, arranged and adapted for the inline detection of ingredients of aqueous food products in the bypass line 34. In some expedient cases, an infrared spectrometer, in some cases a FT-NIR spectrometer, is arranged and adapted for the inline detection of ingredients of aqueous food products in the transfer line 32. Via the transfer line 32 the liquid mixture obtained in the blending container 26 can be transferred to the at least one feed line, which opens into the mixing container of the mixing device 2.

Accordingly, the aqueous system in the blending container and/or in the transfer line from the blending container and/or in the bypass line of the blending container and/or the first and/or second ingredient, in some cases beverage ingredient, or the first and/or second ingredient mixture, in some cases beverage ingredient mixture, in the respective feed line to the blending container and in some cases the third and/or fourth ingredient, in some cases beverage ingredient, or the third and/or fourth ingredient mixture, in some cases beverage ingredient mixture, in the respective feed line to the blending container with the infrared spectrometer assigned to the blending container, the transfer line, the bypass line or the respective feed line can be analyzed for their content of one or more ingredients, in some cases beverage ingredients.

The present disclosure further describes a blending device, adapted and arranged for blending ingredients, in some cases beverage ingredients, by obtaining an aqueous food product concentrate, in some cases a beverage mixture concentrate, containing a mixing container and a feed line to this first mixing container for an aqueous system, in some cases water, and a feed line to this first mixing container for at least one first ingredient, in some cases beverage ingredient, or a first ingredient mixture, in some cases beverage ingredient mixture, and in some cases a feed line to this mixing container for at least one second ingredient, in some cases second beverage ingredient, or a second ingredient mixture, in some cases beverage ingredient mixture, and in some cases a feed line to this mixing container for at least one third ingredient, in some cases beverage ingredient, or a third ingredient mixture, in some cases beverage ingredient mixture, and in some cases a feed line to this mixing container for at least one fourth ingredient, in some cases beverage ingredient, or a fourth ingredient mixture, in some cases beverage ingredient mixture, and at least one discharge line or transfer line for a liquid medium, containing the aqueous food product concentrate blended in the blending device, in some cases beverage mixture concentrate, and in some cases at least one bypass line, which runs from the discharge line or transfer line, in some cases adjacent to the blending device, and which runs into the blending device, and at least one infrared spectrometer, in some cases an FT-NIR spectrometer, arranged and adapted for the inline detection of ingredients of aqueous food products in the discharge line or transfer line, and/or at least one infrared spectrometer, in some cases FT-NIR spectrometer, arranged and adapted for the inline detection of ingredients of aqueous food products in the discharge line or transfer line and/or at least one infrared spectrometer, in some cases an FT-NIR spectrometer, arranged and adapted for the inline detection of ingredients of aqueous food products in the bypass line.

Such blending devices according to the present disclosure are particularly highly expedient that contain a mixing container and a feed line to this mixing container for a aqueous system, in some cases water, and a feed line to this mixing container for a first beverage ingredient or a first beverage ingredient mixture, and a feed line to this mixing container for a second beverage ingredient, or a second beverage ingredient mixture, and in some cases a feed line to this mixing container for a third beverage ingredient or a third beverage ingredient mixture, and in some cases a feed line to this mixing container for a fourth beverage ingredient or a fourth beverage ingredient mixture, and at least one discharge line or transfer line for a liquid medium, containing the aqueous beverage mixture concentrate blended in the blending device, and in some cases at least one bypass line, which runs from the discharge line or the transfer line, in some cases adjacent to the blending device, and which runs into the blending device, and at least one FT-NIR infrared spectrometer, arranged and adapted for the inline detection of ingredients of aqueous food products in the discharge line or at least one FT-NIR infrared spectrometer, arranged and adapted for the inline detection of ingredients of aqueous food products in the first bypass line.

Such facilities according to the present disclosure or such components of these facilities, in some cases facilities, are highly suitable, which are further equipped with at least two, in some cases a plurality of blending devices, adapted and arranged for blending ingredients, in some cases beverage ingredients, obtaining an aqueous food product concentrate, in some cases a beverage mixture concentrate, containing in each case:
  a blending container and
  a feed line to this blending container for an aqueous system, in some cases water, and
  a feed line or a feeding device to this blending container or to the feed line to this blending container for the aqueous system for at least one first ingredient, in some cases beverage ingredient, or a first ingredient mixture, in some cases beverage ingredient mixture, and
  at least one transfer line for a liquid medium, containing or consisting of the aqueous food product concentrate blended in the blending device, in some cases beverage mixture concentrate, which runs into the feed line for fluid media, in some cases liquid media, to the mixing container or merges into the latter, and
  in some cases at least one bypass line, which runs from the transfer line, in some cases adjacent to the blending device, and which in some cases runs into the blending device or downstream, in some cases adjacent to the mixing container, into the transfer line or the feed line for fluid media, in some cases liquid media, to the mixing container, and
  at least one FT-NIR spectrometer, arranged and adapted for the inline detection of ingredients of aqueous food products in the transfer line, and/or
  at least one FT-NIR spectrometer, arranged and adapted for the inline detection of ingredients of aqueous food products in the bypass line, and/or
  at least one FT-NIR spectrometer, arranged and adapted for the inline detection of ingredients of aqueous food products in the blending device.

In the aforementioned embodiment of a facility according to the present disclosure or the component thereof, in some cases in the facility, the FT-NIR spectrometer is used which is arranged and adapted for the inline detection of ingredients of aqueous food products in the transfer line, wherein then in some cases the FT-NIR spectrometer, which is arranged and adapted for the inline detection of ingredients of aqueous food products in the bypass line and the FT-NIR spectrometer, which is arranged and adapted for the inline detection of ingredients of aqueous food products in the mixing device, can be omitted.

Accordingly, also such facilities or such components of these facilities, in some cases facilities, are expedient, which are further equipped with at least two, in some cases a plurality of blending devices, adapted and arranged for blending beverage ingredients obtaining an aqueous beverage mixture concentrate, containing respectively:
  a blending container and
  a feed line to this blending container for an aqueous system, in some cases water, and
  a feed line or a feeding device to this blending container or to the feed line to this blending container for the aqueous system for at least one first beverage ingredient or a first beverage ingredient mixture, and
  at least one transfer line for a liquid medium, containing or consisting of the aqueous beverage mixture concentrate blended in the blending device, which runs into the feed line for liquid media to the mixing container or passes into the latter, and
  at least one bypass line, which runs from the transfer line, in some cases adjacent to the blending device, and which in some other cases runs into the blending device or downstream, in some cases adjacent to the mixing container, into the transfer line or the feed line for fluid media, in some cases liquid media, to the mixing container, and
  at least one FT-NIR spectrometer, arranged and adapted for the inline detection of ingredients of aqueous food products in the transfer line, or
  at least one FT-NIR spectrometer, arranged and adapted for the inline detection of ingredients of aqueous food products in the bypass line.

The use of the at least two blending devices in the aforementioned embodiment surprisingly enables continuous process flow. The ingredients can be blended continuously or quasi continuously in the blending device and transferred into the mixing container of the mixing device, as soon as and as long as the predetermined concentration is determined by means of the infrared spectrometer, in some cases the FT-NIR spectrometer. The batchwise production of the solution containing an ingredient can be omitted at least partly, in some cases even completely, by the use of the aforementioned embodiment.

To achieve this, in one embodiment the infrared spectroscopically determined, in some cases quantitative, data on one or more ingredients, in some cases beverage ingredients, of a batch of the aqueous food product concentrate, in some cases a beverage mixture concentrate, of a batch of the aqueous food product concentrate taken from one of the at least two blending containers via the transfer line, are compared by means of the data processing device with the infrared spectroscopically determined, in some cases quantitative, data on one or more ingredients, in some cases beverage ingredients, of this batch before or on entry into the mixing container of the mixing device via the transfer line.

Furthermore, it has proved to be advantageous for performing and maintaining a continuous or quasi continuous process flow, if the infrared-spectroscopically determined, in some cases quantitative, data on one or more ingredients, in some cases beverage ingredients, of a batch of the aqueous food concentrate taken via the transfer line from one of the at least two blending containers, is compared by means of the data processing device with the infrared spectroscopically determined, in some cases quantitative, data on one or more ingredients, in some cases beverage ingredients, of this charge in the discharge line and/or the bypass line, in some cases the bypass line, of the mixing device. In this way, the concentration of the ingredients of the liquid systems contained in the blending devices can be fine-tuned in a feedback loop, in some cases at short time intervals, depending on the infrared spectroscopically determined data, in some cases quantitative data, on one or more ingredients, in some cases beverage ingredients in the discharge line and/or the bypass line. In this way a continuous process control can be ensured even when used in high-speed production facilities.

In an expedient development of the facility according to the present disclosure or the component of this facility according to the present disclosure furthermore a mass spectrometer, in some cases a qTOF mass spectrometer and in some further cases an ESI-qTOF mass spectrometer is integrated into the facility containing a sample line to this mass spectrometer, arranged and adapted for the detection of ingredients, in some cases beverage ingredients, in aqueous food products or in precursor stages thereof. In this case, sample volumes can also be taken and subsequently analyzed, in some cases also at the points as described above for the infrared spectroscopic investigations. In some expedient cases, sample volumes, in some cases also diluted sample volumes, are fed to the mass spectrometer, in some cases at intervals, via a sampling line which branches off from the connecting line between the mixing and the filling device. By integrating a mass spectrometer into the facility according to the present disclosure or the facility component according to the present disclosure the precision of the measurement over the whole spectrum of relevant ingredients can be improved further and the quality of the monitoring can be increased further.

Furthermore, a plurality of facilities according to the present disclosure can be combined into an array of facilities. In this way a facility according to the present disclosure is a production line.

The present disclosure further describes a method for the, in some cases continuous, production of aqueous food products, in some cases beverages, comprising:
  providing a facility, in some cases a high-speed production facility, according to one or more of the preceding claims,
  providing container base bodies, in some cases beverage container base bodies, in some other cases beverage can base bodies, containing a container bottom, a container wall and a filling opening,
  providing a container closure, in some cases a beverage can lid,
  providing an, in some cases carbonated, aqueous system,
  providing at least one, in some cases a plurality, of ingredients, in some cases beverage ingredients, and
  in some cases providing at least one, in some cases carbonated, aqueous sweetener concentrate,
  mixing the aqueous systems with the at least one or the plurality of ingredients and in some cases the aqueous sweetener concentrate in the mixing device obtaining an aqueous food product, in some cases an aqueous beverage mixture,
  filling the, in some cases carbonated, aqueous food product into the plurality of container base bodies, and
  closing the container base bodies filled with the aqueous food product with a container closure by means of the closure device.

The method according to the present disclosure further comprises:
  the, in some cases quantitative, inline detection of the at least one ingredient in a liquid medium transported in the at least one feed line by the at least one infrared spectrometer assigned to this feed line, and/or
  the, in some cases quantitative, inline detection of the at least one ingredient in the discharge line for liquid media by the at least one infrared spectrometer assigned to this discharge line, and/or
  the, in some cases quantitative, inline detection of the at least one ingredient of the aqueous food product present in the mixing device by the at least one infrared spectrometer assigned to this mixing device, and/or
  the, in some cases quantitative, inline detection of the at least one ingredient in the bypass line for liquid media by the at least one infrared spectrometer assigned to this bypass line.

In some expedient cases, in this way the inline detection of the at least one ingredient is performed by means of infrared spectrometry, in some cases FT-NIR spectrometry, in the discharge line or in the bypass line, in some cases in the bypass line, for liquid media. In this way it is possible to monitor the quality of the aqueous food product before filling into individual containers. The inline detection can be used both for the qualitative and also in some cases the quantitative analysis of the ingredient(s).

In an expedient embodiment of the method according to the present disclosure for the, in some cases continuous, production of beverages, this comprises providing the high-speed production facility according to the present disclosure, providing beverage container base bodies 12, such as beverage can base bodies, containing a container bottom 14, a container wall 16 and a filling opening 18,
  providing a container closure 22, such as a beverage can lid,
  providing an, in some cases carbonated, aqueous system,
  providing a plurality of beverage ingredients, and
  providing at least one, in some cases carbonated, aqueous sweetener concentrate,
  mixing the aqueous system with the plurality of ingredients and the aqueous sweetener concentrate in the mixing device obtaining an aqueous beverage mixture,
  filling the, in some cases carbonated, aqueous food product into the plurality of container base bodies, and
  closing the container base bodies filled with the aqueous food product with a container closure by means of the closure device 20,
  further comprising
  the, in some cases quantitative, inline detection of the plurality of ingredients in a liquid medium transported in the feed line by the at least one FT-NIR spectrometer assigned to this feed line and/or, in some cases and, the, in some cases quantitative, inline detection of the plurality of ingredients in the discharge line for liquid media by the at least one FT-NIR spectrometer assigned to this discharge line or the, in some cases quantitative, inline detection of the plurality of ingredients in the bypass line for liquid media by the at least one infrared spectrometer assigned to this bypass line, or further comprising the, in some cases quantitative, inline detection of a plurality of ingredients in a liquid medium transported in the feed line by the at least one FT-NIR spectrometer assigned to this feed line and/or, in some cases or, the, in some cases quantitative, inline detection of a plurality of ingredients in the bypass line for liquid media by at least one infrared spectrometer assigned to this bypass line.

The, in some cases quantitative, inline detection of the at least one ingredient, in some cases a plurality of ingredients, by means of infrared spectrometry, in some cases FT-NIR spectrometry, in the at least one feed line to the mixing container is provided, in some cases for the infrared spectroscopic monitoring of the discharge line, incorporating the at least one, in some cases the at least two blending devices into the facility according to the present disclosure or the facility component according to the present disclosure. In this way a reliable check of the quality of the concentrate originating from the at least one blending device is ensured, in some cases also by comparison with the data determined by infrared spectroscopy for the concentrate on leaving the blending container for the concentrate produced therein. In this case, the infrared spectroscopically determined, in some cases quantitative, data for one or more ingredients, in some cases beverage ingredients, of a batch of the aqueous food product concentrate, in some cases a beverage mixing concentrate, removed from the blending container via the transfer line can be compared with the infrared spectroscopically determined, in some cases quantitative, data for one or more ingredients, in some cases beverage ingredients, of this batch before or on entry into the mixing container of the mixing device via the feed line. In this way, in addition an identity check of the processed liquid media can be implemented very reliably. In many cases, it is sufficient to carry out a qualitative evaluation by way of the determined data to determine whether the analyzed system can be assigned to a certain, in some cases predefined, category, e.g., energy drink, soft drink, cola drink or the like.

The double testing or multiple testing described above along the production line by means of infrared spectroscopy—once directly after leaving the blending container, and again immediately after the aqueous concentrate enters the mixing container—allows aqueous concentrate obtained in the blending device to be temporarily stored before it is supplied to the mixing device. This makes it possible, to create a material buffer within certain limits, whereby a continuous production process comprising the production of the aqueous food product and its filling into containers can be maintained substantially without complications.

In the method according to the present disclosure the aqueous food product, in some cases beverage, in the mixing device and/or the discharge line and/or in the bypass line, in some cases in the bypass line, is analyzed by the infrared spectrometer assigned to the mixing device, the discharge line or the bypass line, in some cases an FT-NIR spectrometer, in some cases for the content of sugar, in some cases saccharose, glucose and/or fructose, citric acid, caffeine, taurine and/or, in some cases and, artificial sweeteners, in some cases acesulfame K and/or aspartame, in some cases quantitatively. It is also expedient in this case here that two or more ingredients can be determined simultaneously.

The data, in some cases quantitative data, of the respective ingredients, in some cases beverage ingredients, of the liquid media or the aqueous food product determined by infrared spectroscopy using the method according to the present disclosure are expediently stored on a data processing device. It has proven to be very practical to assign this data on the respective ingredients, in some cases beverage ingredients of the fluid media or the aqueous food product determined by infrared spectroscopy in the data processing device to the respective measurement time point.

By knowing which ingredients are used for an aqueous food product, the data of the respective ingredients, in some cases beverage ingredients, of the liquid medium or the aqueous food product determined by infrared spectroscopy for a measuring time point can be compared with stored target value range on the data processing device. The method according to the present disclosure thus enables both a quantitative and also qualitative analysis of the respective ingredients.

As the method according to the present disclosure enables a continuous or an quasi continuous control of the content of ingredients, this method can also be used to intervene in the running production process in a regulative way. The access of the aqueous food product, in some cases the beverage mixture, to the filling device can be prevented by means of a diverter valve, in some cases its automatic activation, in the discharge line, as soon as the infrared spectroscopically determined, in some cases quantitative, data on at least one ingredient, in some cases beverage ingredient, of the aqueous food product is outside its stored target value range, so that the aqueous food product does not enter the filling device. Alternatively, a diverter valve in the discharge line can remain closed or be closed as long as or as soon as the infrared spectroscopically determined, in some cases quantitative data for all ingredients, in some cases beverage ingredients, of the aqueous food are within their respective stored target value ranges.

In an expedient embodiment of the method according to the present disclosure it can also be provided for the purpose of obtaining an optimized process flow, that if the infrared spectroscopically determined, in some cases quantitative, data on one or more ingredients, in some cases beverage ingredients, of the liquid medium transported in the at least one feed line are below the stored target value ranges, the concentration of the ingredient or ingredients in the liquid medium, which is transported in the at least one feed line, is increased, until the infrared spectroscopically determined data are within the stored target value ranges, or that if the infrared spectroscopically determined, in some cases quantitative, data on one or more ingredients, in some cases beverage ingredients, of the liquid medium transported in the at least one feed line, are above the stored target value ranges, the concentration of the ingredient or ingredients in the liquid medium, which is transported in the at least one feed line, is decreased until the infrared spectroscopically determined data are within the stored target value ranges.

Accordingly it also provided in an expedient embodiment of the method according to the present disclosure that a falling below or an exceeding of a target value range determined by at least one FT-NIR spectrometer for the aqueous food product in the mixing container, in the discharge line and/or in the bypass line of the mixing device in the data processing device for a beverage ingredient the data processing device the blending device, in which the aqueous beverage mixing concentrate, containing the ingredient is blended, is controlled such that the concentration of this ingredient in the beverage mixing concentrate is increased or reduced until the target value range stored for hie ingredient in the data processing device for the aqueous food product in the mixing container is reached. In this way, a continuous operation can also be ensured with a high-speed facility. In some cases, it is no longer necessary to produce the beverage ingredient concentrates in the blending container in batches.

Alternatively, and in some cases additionally, it can be provided that if the infrared spectroscopically determined, in some cases quantitative, data for one or more ingredients, in some cases beverage ingredients, of the aqueous food product present in the mixing device are below the stored target value ranges, the concentration of the ingredient or ingredients in the aqueous food product present in the mixing device is increased until the infrared spectroscopically determined data are within the stored target value ranges, or in that if the infrared spectroscopically determined, in some cases quantitative data for one or more ingredients, in some cases beverage ingredients, of the aqueous food product present in the mixing device are above the stored target value ranges, the concentration of the ingredient or ingredients of the aqueous food product present in the mixing device is reduced until the infrared spectroscopically determined data are within the stored target value ranges. Only when this state is reached, in a very advantageous embodiment, the aqueous food product present in the mixing deice is passed to the filling device via the discharge line.

With the facility according to the present disclosure or the facility component according to the present disclosure and the method according to the present disclosure by incorporating at least one infrared spectrometer, in some cases an FT-NIR infrared spectrometer one or more ingredients for aqueous food products, in some cases beverages, in a facility for producing a plurality of containers, in some cases beverage containers filled with an aqueous food product, in some cases beverage can be detected in some cases quantitatively, if several ingredients are used even simultaneously, whereby by an, in some cases quantitative, inline monitoring of one or more ingredients for aqueous food products, in some cases beverages, is possible in a facility for producing a plurality of containers, in some cases beverage containers filled with an aqueous food product. Surprisingly, it has also be found that the method according to the present disclosure can be used reliably in facilities for the high-speed production of a plurality of containers filled with an aqueous food product, in some cases beverage containers. By incorporating the infrared spectrometer, in some cases an FT-NIR infrared spectrometer, into the facility according to the present disclosure or facility component according to the present disclosure as an inline measuring tool, the measuring accuracy over the whole spectrum of relevant ingredients can be improved compared to known systems that regularly operate off-line and the quality of the monitoring can be increased. By means of the present disclosure it is no longer necessary to create a calibration model for each ingredient in a sample matrix to be analyzed, in which a standard addition has to be made at different concentrations in the matrix for each ingredient to be analyzed, and in which the ingredients have to be combined differently to determine mutual interactions with one another. The present disclosure also does not make use of a multivariate data evaluation, let alone one in which selected spectra of the standard additions of the ingredients and their different combinations are to be included for each individual substance to create the calibration model.

The features of the present disclosure disclosed in the above description and in the claims can be essential both individually and in any combination for the implementation of the disclosure in its various embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A facility for producing a plurality of containers filled with an aqueous food product, wherein the facility is a facility for high-speed production of a plurality of containers filled with the aqueous food product, comprising:
   at least one mixing device with a mixing container;
   at least one feed line to the mixing container for liquid media containing at least one ingredient or multiple ingredients for the aqueous food product;
   a discharge line from the mixing container for the aqueous food product mixed in the at least one mixing device; and
   a bypass line which runs from the discharge line, wherein the facility further comprises:
     (1) at least one FT-NIR spectrometer arranged and adapted for a quantitative inline detection of the at least one ingredient or multiple ingredients for the aqueous food product in the at least one discharge line,
     wherein the at least one FT-NIR spectrometer in element (1) comprises at least one light guide and a transmission process probe, arranged and adapted to come into contact with the liquid media containing the at least one ingredient or multiple ingredients, or with the aqueous food product, or
     (2) at least one FT-NIR spectrometer arranged and adapted for a quantitative inline detection of the at least one ingredient or multiple ingredients for the aqueous food product in the bypass line,
     wherein the at least one FT-NIR spectrometer in element (2) comprises at least one light guide and a transmission process probe, arranged and adapted to come into contact with the liquid media containing the at least one ingredient or multiple ingredients, or with the aqueous food product,
   the facility further comprising:
     at least one blending device adapted and arranged for blending ingredients and obtaining an aqueous food product concentrate, the at least one blending device containing:
     a blending container;
     a first feed line to the blending container for an aqueous system;
     a second feed line to the blending container for at least one first ingredient or a first ingredient mixture;
     at least one transfer line for a liquid medium containing the aqueous food product concentrate blended in the at least one blending device, which runs into the at least one feed line for fluid media to the mixing container or merges into the latter; and
     a bypass line which runs from the transfer line and which opens into the blending container; and (3) at least one FT-NIR spectrometer arranged and adapted for a quantitative inline detection of ingredients for an aqueous food product in the bypass line of the blending device, wherein the at least one FT-NIR spectrometer in element (3) comprises at least one light guide and a transmission process probe, arranged and adapted to come into contact with the aqueous food product concentrate, wherein the at least one FT-NIR spectrometer in element (1) or element (2) and in element (3) is adapted and arranged to simultaneously determine the content of two or more ingredients, and wherein the at least one FT-NIR spectrometer in element (1) or element (2) and in element (3) is adapted and arranged to detect the two or more ingredients of the aqueous food product at recurring measurement intervals in a range of 5 to 90 seconds.

2. The facility according to claim 1, further comprising:
at least one FT-NIR spectrometer, arranged and adapted for an inline detection of the at least one ingredient or multiple ingredients for the aqueous food product in the at least one mixing device,
wherein the at least one FT-NIR spectrometer for the mixing device comprises at least one light guide and a transmission process probe, arranged and adapted to come into contact with the aqueous food product in the at least one mixing device.

3. The facility according to claim 1, further comprising:
a filling device, which is connected or connectable to the at least one mixing device via the discharge line, arranged and adapted for filling the aqueous food product obtained or obtainable by the at least one mixing device, into a plurality of container base bodies, each container base body containing a container bottom, a container wall, and a filling opening.

4. The facility according to claim 1, wherein the at least one FT-NIR spectrometer in element (1) or element (2) comprises a data processing device arranged and adapted to store and evaluate infrared spectroscopically determined data of a respective ingredient or ingredients of the liquid media or of the aqueous food product.

5. The facility according to claim 3, further comprising:
at least one closure device adapted and arranged for closing each container base body filled by the filling device with a container closure.

6. The facility according to claim 1, further comprising:
a mass spectrometer containing a sample line, arranged and adapted for detection of the ingredients in the aqueous food product or in preliminary stages thereof.

7. A method for the production of an aqueous food product, comprising:
providing a facility according to claim 1,
providing container base bodies, each container base body containing a container bottom, a container wall, and a filling opening,
providing a container closure,
providing an aqueous system,
providing at least one ingredient or multiple ingredients,
mixing the aqueous system with the at least one ingredient or multiple ingredients in the at least one mixing device, and obtaining the aqueous food product,
filling the aqueous food product into the container base bodies, and
closing the container base bodies filled with the aqueous food product with the container closure by way of a closure device,
the method further comprising:

quantitative inline detection of the at least one ingredient or multiple ingredients in the liquid media transported in the at least one discharge line, by the at least one FT-NIR spectrometer assigned to the at least one discharge line, or quantitative inline detection of the at least one ingredient or multiple ingredients for the aqueous food product in the bypass line, by the at least one FT-NIR spectrometer assigned to the bypass line, wherein infrared spectroscopically determined data on respective ingredients of the liquid media or the aqueous food product, are stored on a data processing device, and wherein the infrared spectroscopically determined data are assigned on the data processing device to a measuring time point.

8. The method according to claim 7, wherein the aqueous food product in the at least discharge line and/or the bypass line is analyzed by the respective FT-NIR spectrometer assigned to the at least one discharge line or the bypass line, for a content of sugar, citric acid, caffeine, taurine, and/or artificial sweeteners.

9. The method according to claim 7, wherein the infrared spectroscopically determined data on the respective ingredients assigned to the measuring time point are assigned to a container base body filled by a filling device with the aqueous food product, or a plurality of successive container base bodies filled with the aqueous food product.

10. The method according to claim 7, wherein the infrared spectroscopically determined data on the respective ingredients of the liquid media or of the aqueous food product for a measuring time point are compared in the data processing device with stored target value ranges.

11. The method according to claim 10, wherein an access of the aqueous food product to the filling device is prevented by a diverter valve in the discharge line as soon as the infrared spectroscopically determined data for at least one ingredient of the aqueous food product is outside its stored target value range so that the aqueous food product does not enter the filling device.

12. The method according to claim 10, wherein a diverter valve in the discharge line remains closed or is closed as long as or as soon as the infrared spectroscopically determined data for all ingredients of the aqueous food product are within their respectively stored target value ranges, and/or wherein if the infrared spectroscopically determined data for one or more ingredients of the liquid media transported in the at least one feed line are below the stored target range values, the concentration of the one or more ingredients in the liquid media is increased until the infrared spectroscopically determined data lies within the stored target range values, and/or wherein if the infrared spectroscopically determined data for one or more ingredients of the liquid media transported in the at least one feed line are above the stored target value ranges, the concentrations of the one or more ingredients in the liquid media are decreased until the infrared spectroscopically determined data is within the stored target value ranges.

13. The method according to claim 7, wherein the infrared spectroscopically determined data for one or more ingredients of a batch of an aqueous food product concentrate removed via a transfer line from a blending container are compared with the infrared spectroscopically determined data for one or more ingredients of the batch before or on entry into the mixing container of the mixing device via the at least one feed line.

14. An array of facilities, comprising at least two facilities according to claim 1.

15. The facility according to claim 1, wherein the bypass line runs from the discharge line and opens downstream into the discharge line.

16. The facility according to claim 15, wherein the bypass line runs from the discharge line adjacent to the at least one mixing device, and which opens downstream into the discharge line adjacent to the filling device, and wherein the transmission process probe is arranged and adapted to come into contact with the aqueous food product between an outlet of the bypass line and an opening of the discharge line.

17. The facility according to claim 1, wherein the aqueous food product is a beverage.

18. The facility according to claim 4, wherein the data processing device is arranged and adapted to compare the infrared spectroscopically determined data of the respective ingredients of the liquid media or the aqueous food product with reference data stored in a data processing device for the respective ingredient or ingredients.

19. The method according to claim 8, wherein the respective infrared spectrometer analyzes the aqueous food product continuously or quasi- continuously.

\* \* \* \* \*